(12) United States Patent
Zhang

(10) Patent No.: US 12,384,325 B2
(45) Date of Patent: Aug. 12, 2025

(54) SAFETY BELT AUTOMATIC ADJUSTMENT APPARATUS AND CHILD SAFETY SEAT THEREWITH

(71) Applicant: Bambino Prezioso Switzerland AG, Steinhausen (CH)

(72) Inventor: Da Liang Zhang, Guangdong (CN)

(73) Assignee: Bambino Prezioso Switzerland AG, Steinhausen (CH)

( * ) Notice: Subject to any disclaimer, the term of this patent is extended or adjusted under 35 U.S.C. 154(b) by 0 days.

(21) Appl. No.: 18/389,693

(22) Filed: Dec. 19, 2023

(65) Prior Publication Data

US 2024/0123941 A1  Apr. 18, 2024

Related U.S. Application Data

(63) Continuation of application No. 17/875,442, filed on Jul. 28, 2022, now Pat. No. 11,878,650, which is a
(Continued)

(30) Foreign Application Priority Data

Nov. 11, 2019  (CN) .......................... 201911095674.3

(51) Int. Cl.
*B60N 2/28* (2006.01)
*B60R 22/10* (2006.01)
(Continued)

(52) U.S. Cl.
CPC .......... *B60R 22/341* (2013.01); *B60N 2/2803* (2013.01); *B60N 2/2812* (2013.01);
(Continued)

(58) Field of Classification Search
CPC ..... B60R 22/341; B60R 22/105; B60R 22/18; B60R 22/357; B60R 22/26; B60R 22/34;
(Continued)

(56) References Cited

U.S. PATENT DOCUMENTS 3,750,102 A  7/1973  Okada
3,974,979 A  8/1976  Fieni
(Continued)

FOREIGN PATENT DOCUMENTS

EP  1 088 695 A2  4/2001
EP  1 623 892 A1  2/2006
(Continued)

OTHER PUBLICATIONS

"International Search Report" mailed on Dec. 7, 2020 for International application No. PCT/EP2020/081627, International filing date: Nov. 10, 2020.

*Primary Examiner* — Keith J Frisby
(74) *Attorney, Agent, or Firm* — Winston Hsu

(57) ABSTRACT

A safety belt automatic adjustment apparatus includes a safety belt buckle fastening assembly, a safety belt retractor and a linking component. The safety belt buckle fastening assembly is rotatably connected to a seat body of a child safety seat and for connecting with a safety belt buckle. The safety belt retractor is used for retracting a safety belt, and the safety belt retractor includes a restraining assembly for restraining a movement of the safety belt in a predetermined direction. The linking component is installed between the safety belt buckle fastening assembly and the safety belt retractor, and the safety belt buckle fastening assembly rotates to drive the linking component and the restraining assembly, so as to restrain or release the safety belt winding around the safety belt retractor. The safety belt automatic adjustment apparatus has advantages of automatic adjustment for the safety belt, simple structure, convenient operation and enhanced safety.

19 Claims, 6 Drawing Sheets

Related U.S. Application Data continuation of application No. 17/093,520, filed on Nov. 9, 2020, now Pat. No. 11,427,152.

(51) Int. Cl.
  *B60R 22/18* (2006.01)
  *B60R 22/34* (2006.01)

(52) U.S. Cl.
  CPC .......... *B60N 2/2816* (2023.08); *B60R 22/105* (2013.01); *B60R 22/18* (2013.01)

(58) Field of Classification Search
  CPC ................ B60N 2/2812; B60N 2/2803; B60N 2002/2815
  See application file for complete search history.

(56) References Cited

U.S. PATENT DOCUMENTS

| | | |
|---|---|---|
| 4,135,683 A | 1/1979 | Stephenson |
| 4,337,906 A | 7/1982 | Colasanti |
| 4,391,420 A | 7/1983 | Ahad |
| 4,420,127 A | 12/1983 | Kondziola |
| 4,720,148 A | 1/1988 | Anthony |
| 5,061,012 A | 10/1991 | Parker |
| 5,380,066 A | 1/1995 | Wiseman |
| 5,398,997 A | 3/1995 | McFalls |
| 5,484,190 A | 1/1996 | Corrion |
| 5,503,461 A | 4/1996 | Schreier |
| 5,511,856 A | 4/1996 | Merrick |
| 5,611,603 A | 3/1997 | Gray |
| 5,779,319 A | 7/1998 | Merrick |
| 5,799,894 A | 9/1998 | Kohlndorfer |
| 6,371,563 B1 | 4/2002 | Washizuka |
| 8,444,222 B2 | 5/2013 | Buckingham |
| 8,944,503 B2 | 2/2015 | Gates |
| 10,173,553 B2 | 1/2019 | Mitchell |
| 10,328,894 B2 | 6/2019 | Geist |
| 10,894,491 B2 | 1/2021 | Persson |
| 2004/0251722 A1 | 12/2004 | Boyle |
| 2007/0069060 A1 | 3/2007 | Maciejczyk |
| 2009/0065621 A1 | 3/2009 | Woellert |
| 2012/0074758 A1 | 3/2012 | Gates |
| 2017/0144624 A1 | 5/2017 | Geist |
| 2017/0267210 A1 | 9/2017 | Jaradi |
| 2020/0346566 A1 | 11/2020 | Frank |

FOREIGN PATENT DOCUMENTS

| | | |
|---|---|---|
| GB | 2 175 194 A | 11/1986 |
| JP | 61-261150 A | 11/1986 |
| JP | 2023-500730 A | 1/2023 |
| KR | 2002-0037704 A | 5/2002 |
| TW | 433217 | 5/2001 |
| WO | 2017/220738 A1 | 12/2017 |

SAFETY BELT AUTOMATIC ADJUSTMENT APPARATUS AND CHILD SAFETY SEAT THEREWITH

CROSS REFERENCE TO RELATED APPLICATIONS

This application is a continuation application of U.S. application Ser. No. 17/875,442, filed on Jul. 28, 2022, which is a continuation application of U.S. application Ser. No. 17/093,520, filed on Nov. 9, 2020. The contents of these applications are incorporated herein by reference.

BACKGROUND OF THE INVENTION

1. Field of the Invention

The present invention relates to a safety belt automatic adjustment apparatus and a child safety seat therewith, and more particularly, to a safety belt automatic adjustment apparatus and a child safety seat having advantages of automatic adjustment for a safety belt, simple structure, convenient operation and enhanced safety.

2. Description of the Prior Art

In order to enhance safety of riding in motor vehicles, a child safety seat is adapted for children at the age of 0 to 12 years. Besides the safety concern, convenience is another important topic of the child safety seat. For children of different ages and different body shapes, a safety belt on the child safety seat often needs to be adjusted. However, conventional safety belt adjustment is often troublesome. The safety belt passes through a bottom of the child safety seat and is exposed in front of the child safety seat. A bottom of the safety belt needs to be pulled by hand for adjusting a length of the safety belt, and the safety belt can be locked at a desired position by a webbing locking component inside, which is very inconvenient and not suitable for people's current needs. Therefore, it is desirable to provide an improved safety belt automatic adjustment apparatus with simple structure, convenient operation and enhanced safety for solving or at least ameliorating the aforementioned problems.

SUMMARY OF THE INVENTION

Therefore, the present invention is to provide desirably provides a safety belt automatic adjustment apparatus and a child safety seat having advantages of automatic adjustment for a safety belt, simple structure, convenient operation and enhanced safety, for solving the aforementioned problems.

An aspect of the present invention provides a safety belt automatic adjustment apparatus including a safety belt retractor for retracting a safety belt. The safety belt retractor includes a rotating shaft, a restraining assembly, a first ratchet and a second ratchet. The first ratchet and the second ratchet are connected to two ends of the rotating shaft, the safety belt winds around the rotating shaft, the restraining assembly is configured to selectively engage with or separate from the first ratchet and the second ratchet, and directions of teeth of the first ratchet and the second ratchet are opposite to each other. A rotation in a first direction of the rotating shaft is restrained so as to restrain the safety belt from releasing from the rotating shaft when the first ratchet is engaged with the restraining assembly and the second ratchet is separated from the restraining assembly, and a rotation in a second direction opposite to the first direction of the rotating shaft is restrained so as to restrain the safety belt from winding around the rotating shaft when the second ratchet is engaged with the restraining assembly and the first ratchet is separated from the restraining assembly.

Preferably, the restraining assembly includes a first restraining component for selectively engaging with or separating from the first ratchet, and a second restraining component for selectively engaging with or separating from the second ratchet. When the first restraining component is engaged with the first ratchet, the second restraining component is separated from the second ratchet, and when the second restraining component is engaged with the second ratchet, the first restraining component is separated from the first ratchet.

Preferably, the safety belt retractor further includes a retractor installation component, the rotating shaft, the first ratchet and the second ratchet are pivotally connected to the retractor installation component, and the first restraining component is installed on the retractor installation component in a swingable manner and for selectively engaging with or separating from the first ratchet.

Preferably, the safety belt automatic adjustment apparatus further includes a linking component for driving the first restraining component and the second restraining component simultaneously, and the linking component drives the first restraining component to separate from the first ratchet and drives the second restraining component to engage with the second ratchet simultaneously.

Preferably, an abutting portion is formed on the linking component, the abutting portion is spaced from the first restraining component when the first restraining component is engaged with the first ratchet, and the abutting portion abuts against the first restraining component when the first restraining component is separated from the first ratchet.

Preferably, a groove structure is formed on the linking component, the abutting portion is a lateral wall of the groove structure, and the first restraining component is disposed in the groove structure, the first restraining component moves in the groove structure when the linking component moves, and the first restraining component abuts against the abutting portion along a moving direction of the linking component when the first restraining component is separated from the first ratchet.

Preferably, the first restraining component extends along an axial direction of the rotating shaft, an end of the first restraining component is configured to engage with or separate from the first ratchet, and another end of the first restraining component is driven by the linking component.

Preferably, the first restraining component and the second restraining component are located at two sides of the second ratchet along a radial direction of the rotating shaft, and the first restraining component is spaced from the second ratchet.

Preferably, the safety belt automatic adjustment apparatus further includes two resilient components, one of the two resilient components is biased to drive the first restraining component to engage with the first ratchet, and the other of the two resilient components is biased to drive the second restraining component to engage with the second ratchet.

Preferably, the safety belt retractor further includes a retractor installation component, the rotating shaft, the first ratchet and the second ratchet are pivotally connected to the retractor installation component, a middle portion of the second restraining component is pivotally connected to the retractor installation component, an end of the second restraining component is driven by the linking component, and another end of the second restraining component is configured to engage with or separate from the second ratchet.

Preferably, a sliding hole is formed on the linking component, the end of the second restraining component slides in the sliding hole when the linking component moves, and the end of the second restraining component abuts against an edge of the sliding hole along the moving direction of the linking component when the second restraining component is engaged with the second ratchet.

Preferably, the safety belt automatic adjustment apparatus further includes a safety belt buckle fastening assembly for buckling with a safety belt buckle, the safety belt buckle fastening assembly is exposed out of abase of a child safety seat and rotatable relative to the base of the child safety seat around an axis, and the safety belt buckle fastening assembly rotates to drive the linking component to move.

Preferably, the safety belt buckle fastening assembly rotates to drive the linking component to move in a circumferential direction around the axis.

Preferably, the safety belt buckle fastening assembly includes a rotary shaft and an insertion component connected to the rotary shaft, the insertion component is exposed out of the base of the child safety seat, the linking component is connected to the rotary shaft, the insertion component moves to drive the rotary shaft to rotate around the axis, and the rotary shaft rotates to drive the linking component to move in a circumferential direction around the axis.

Preferably, the second restraining component is located between the safety belt buckle fastening assembly and the first restraining component along an extending direction of the linking component.

A further aspect of the present invention provides a child safety seat including the aforesaid safety belt automatic adjustment apparatus.

In summary, the safety belt retractor can be locked or released by adjusting statuses of the safety belt buckle fastening assembly of the safety belt automatic adjustment apparatus of the present application, so as to lock or release the safety belt automatically. When a child sits on the child safety seat and the safety belt buckle fastening assembly buckles with the safety belt buckle, the safety belt can be tightened automatically, which has advantages of automatic adjustment for the safety belt without manual adjustment, simple structure, convenient operation and enhanced safety.

These and other embodiments of the present invention will no doubt become obvious to those of ordinary skill in the art after reading the following detailed description of the preferred embodiment that is illustrated in the various figures and drawings. In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

DETAILED DESCRIPTION

In order to illustrate technical specifications and structural features as well as achieved purposes and effects of the present invention, relevant embodiments and figures are described as follows.

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
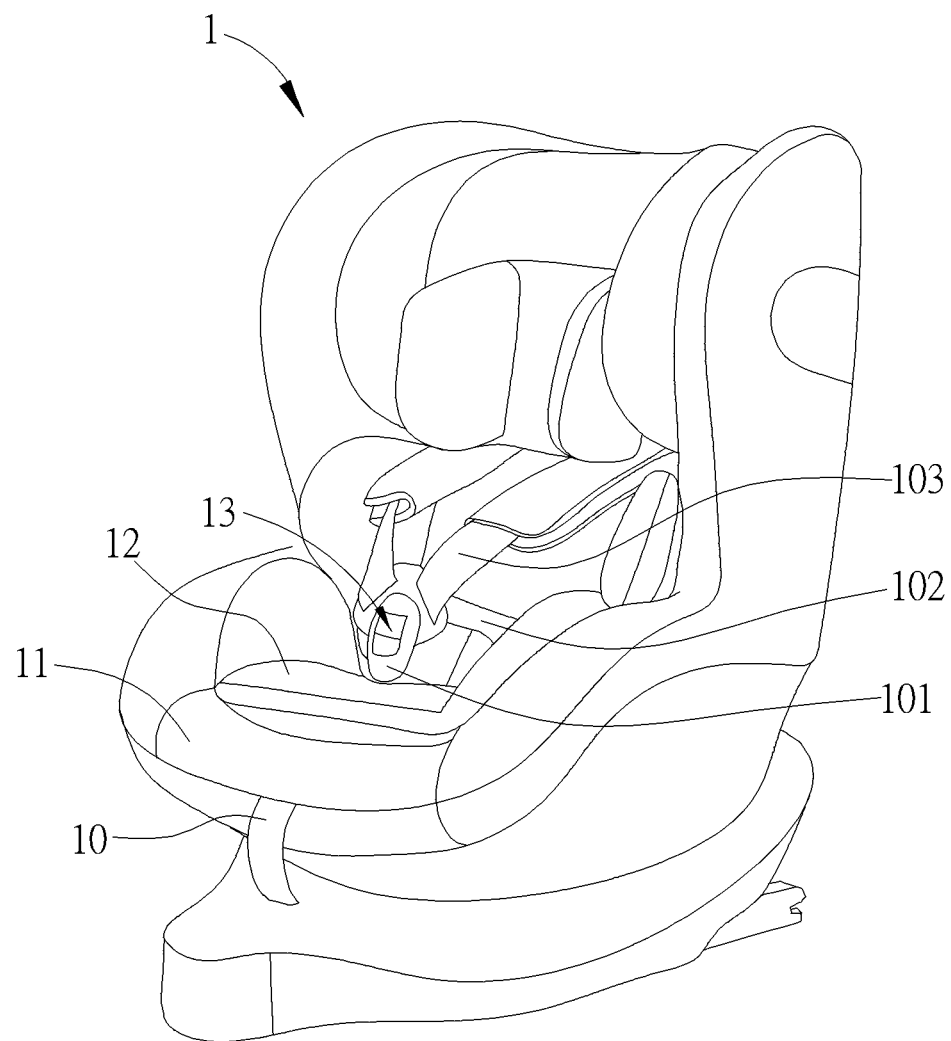
FIG. 1 is a schematic drawing of a child safety seat according to an embodiment of the present application.
Figure 2:
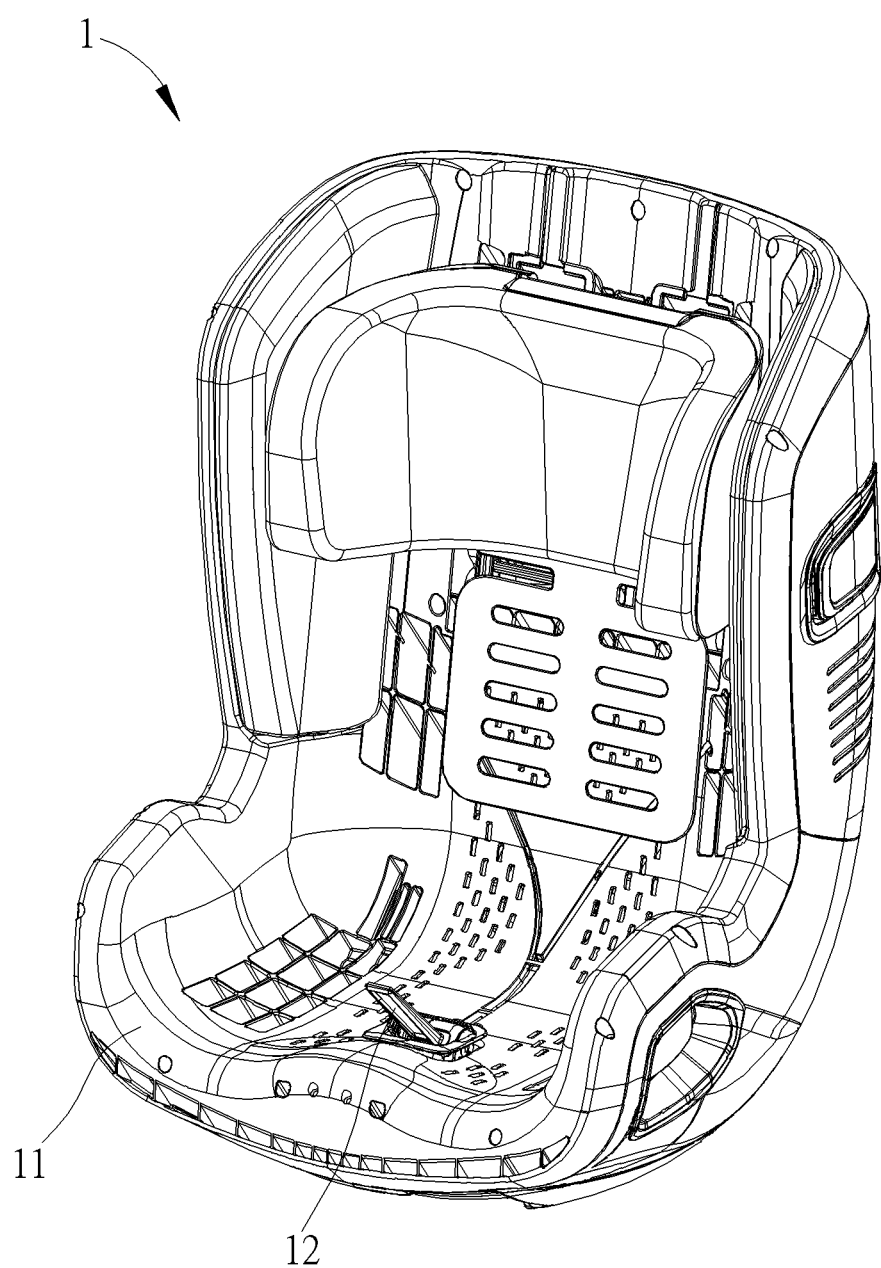
FIG. 2 is a diagram of a seat body of the child safety seat according to the embodiment of the present application.
Figure 3:
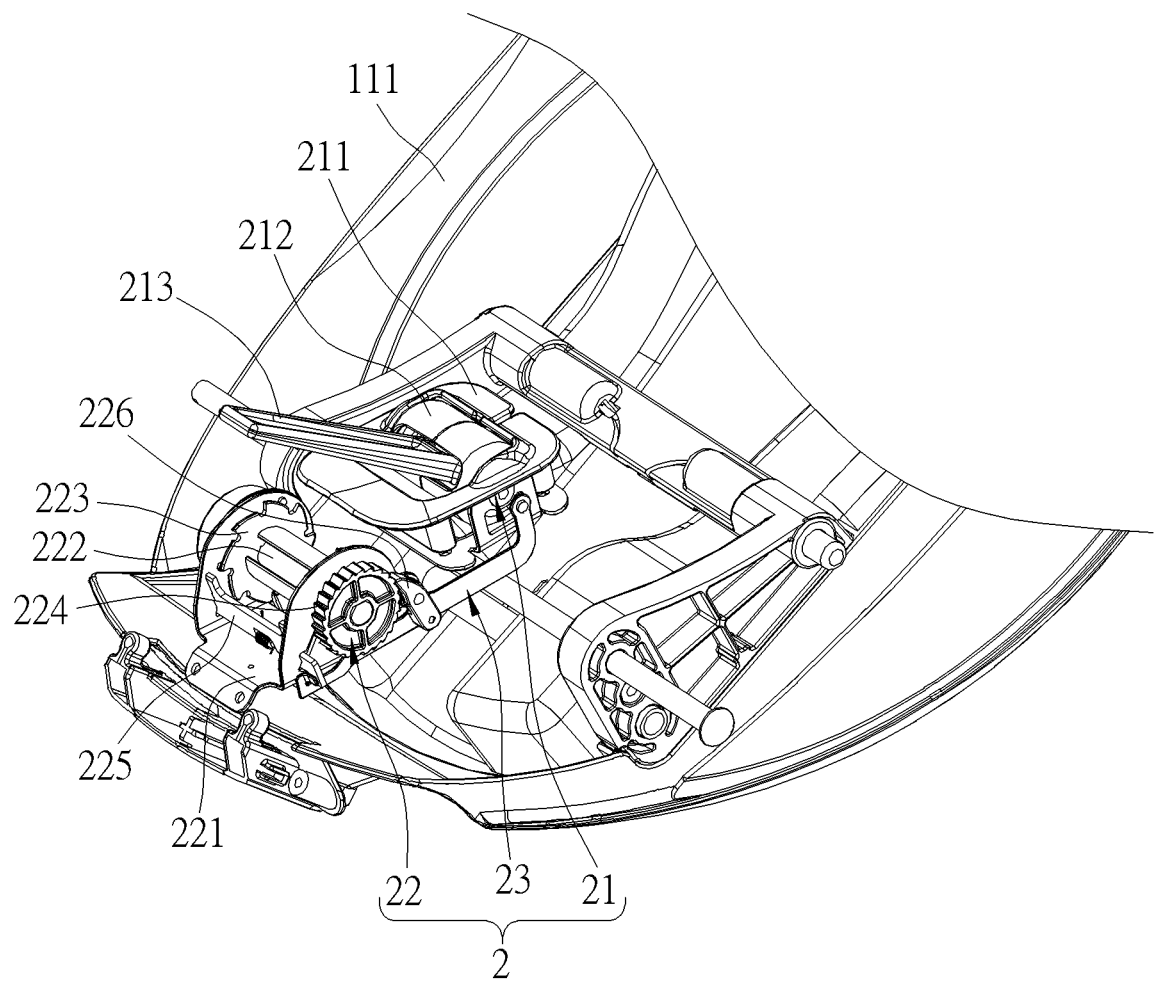
FIG. 3 is a diagram of a safety belt automatic adjustment apparatus in a releasing status according to the embodiment of the present application.
Figure 4:
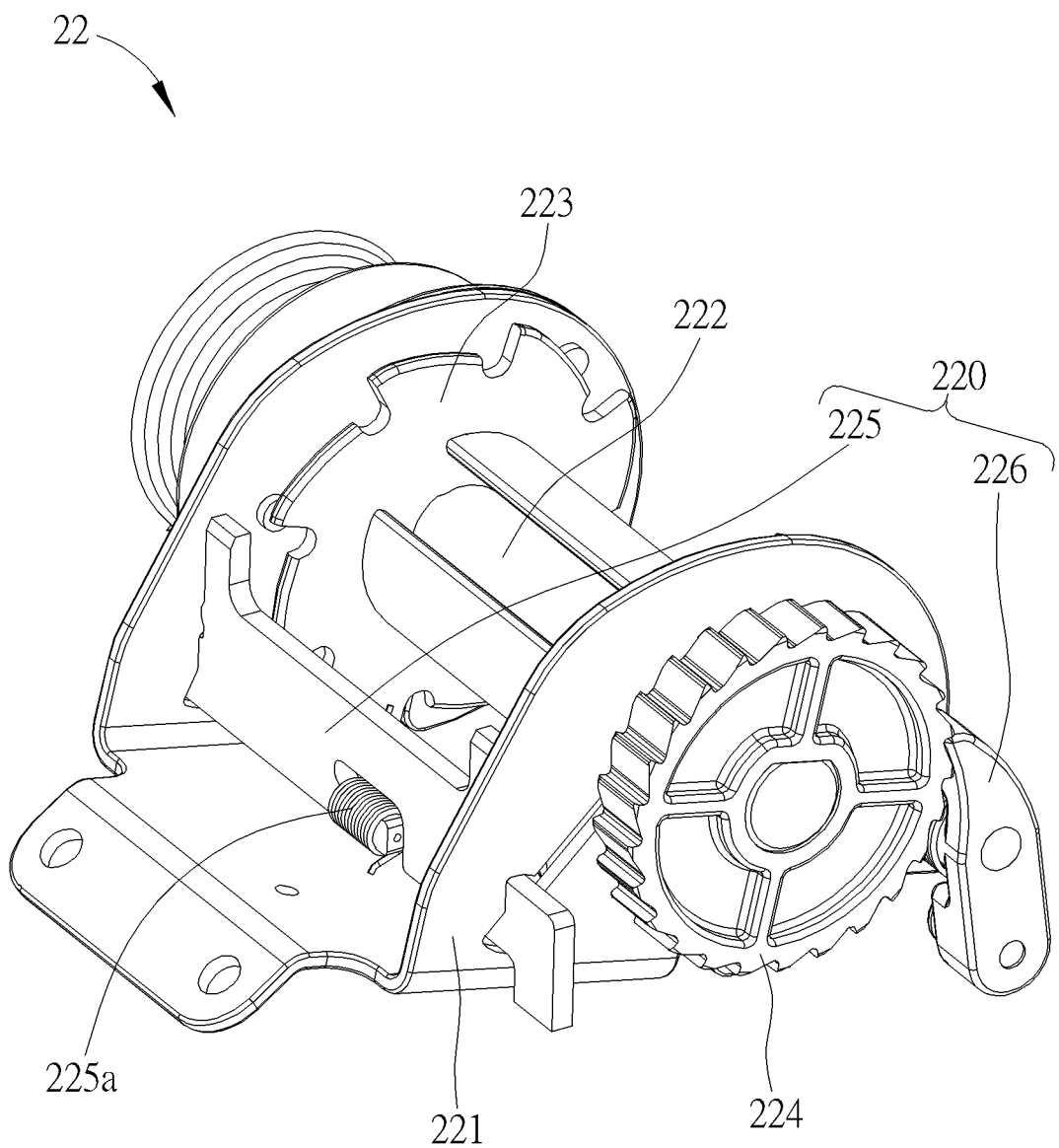
FIG. 4 is a diagram of a safety belt retractor of the safety belt automatic adjustment apparatus in the releasing status according to the embodiment of the present application.
Figure 5:
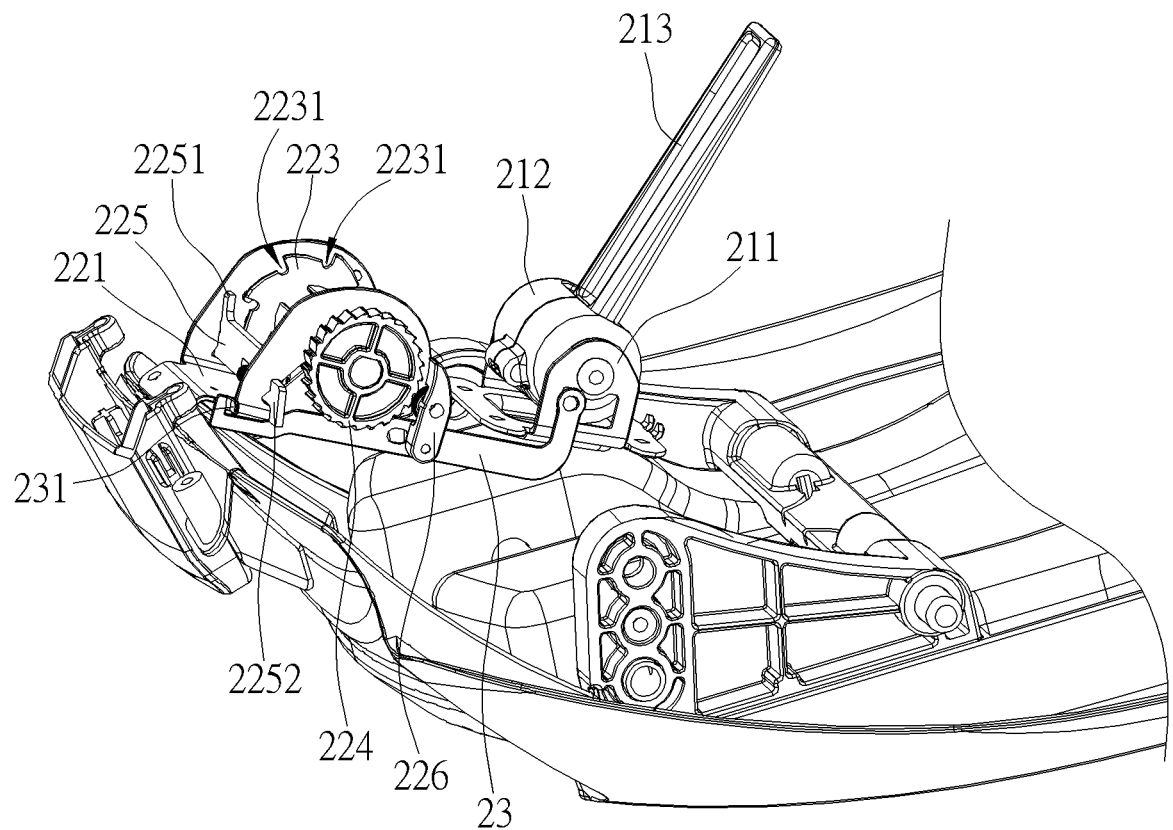
FIG. 5 is a diagram of the safety belt automatic adjustment apparatus in a restraining status according to the embodiment of the present application.
Figure 6:
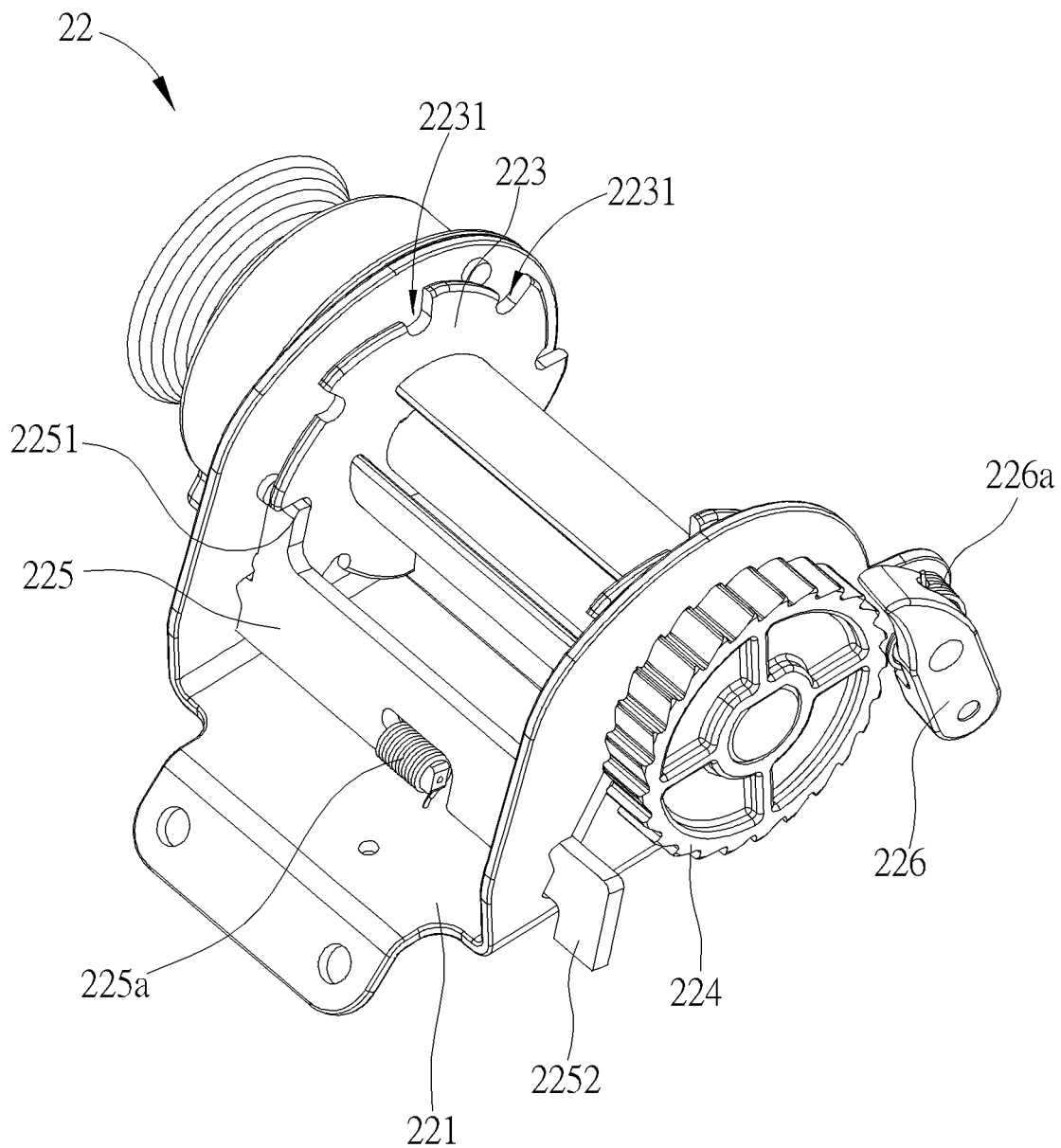
FIG. 6 is a diagram of the safety belt retractor of the safety belt automatic adjustment apparatus in the restraining status according to the embodiment of the present application.

Please refer to FIG. 1 to FIG. 6. FIG. 1 is a schematic drawing of a child safety seat 1 according to an embodiment of the present application. FIG. 2 is a diagram of a seat body 11 of the child safety seat 1 according to the embodiment of the present application. FIG. 3 is a diagram of a safety belt automatic adjustment apparatus 2 in a releasing status according to the embodiment of the present application. FIG. 4 is a diagram of a safety belt retractor 22 of the safety belt automatic adjustment apparatus 2 in the releasing status according to the embodiment of the present application. FIG. 5 is a diagram of the safety belt automatic adjustment apparatus 2 in a restraining status according to the embodiment of the present application. FIG. 6 is a diagram of the safety belt retractor 22 of the safety belt automatic adjustment apparatus 2 in the restraining status according to the embodiment of the present application. The child safety seat 1 includes the seat body 11 and a seat pad 12 installed on the seat body 11. The child safety seat 1 further includes a safety belt 10 and a safety belt buckle 13 connected to the safety belt 10. The safety belt 10 includes a cross belt 101, a waist belt 102 and two shoulder belts 103. The child safety seat 1 further includes the safety belt automatic adjustment apparatus 2 for connecting or buckling with the safety belt buckle 13. When a child is seated on the child safety seat 1, the safety belt 10 can be tightened automatically after the safety belt buckle 13 is buckled with the safety belt automatic adjustment apparatus 2 without manual adjustment.

As shown in FIG. 3, the safety belt automatic adjustment apparatus 2 is installed in a base 111 of the seat body 11 of the child safety seat 1. The safety belt automatic adjustment apparatus 2 includes a safety belt buckle fastening assembly 21, the safety belt retractor 22, and a linking component 23 installed between the safety belt buckle fastening assembly 21 and the safety belt retractor 22. Specifically, the safety belt buckle fastening assembly 21 is rotatably connected to the base 111 of the seat body 11 around an axis and exposed out of the base 111 of the seat body 11. The safety belt buckle fastening assembly 21 is configured to buckle with the safety belt buckle 13. The safety belt buckle fastening assembly 21 includes an installation component 211, a rotary shaft 212 installed on the installation component 211, and an insertion component 213 connected to the rotary shaft 211 and for connecting or buckling with the safety belt buckle 13. The insertion component 213 is exposed out of the base 111 of the seat body 11, the linking component 23 is connected to the rotary shaft 212, the insertion component 213 moves to drive the rotary shaft 212 to rotate around the axis, and the rotary shaft 212 rotates to drive the linking component 23 to move in a circumferential direction around the axis. The circumferential direction includes upward/downward direction and forward/backward direction.

The linking component 23 is installed between the safety belt buckle fastening assembly 21 and the safety belt retractor 22. Specifically, a first end of the linking component 23 is fixed on the rotary shaft 212 of the safety belt buckle fastening assembly 21, and a second end of the linking component 23 extends to abut against the safety belt retractor 22. The safety belt buckle fastening assembly 21 rotates to drive the linking component 23 to move in the circumferential direction around the axis. That is, the linking component 23 can move forward or backward with rotation of the safety belt buckle fastening assembly 21, so as to restrain or release the safety belt 10 winding around the safety belt retractor 22.

As shown in FIG. 4 and FIG. 6, the safety belt retractor 22 includes a retractor installation component 221, a rotating shaft 222, a first ratchet 223 and a second ratchet 224. The safety belt 10 winds around the rotating shaft 222. The rotating shaft 222 is pivotally connected to the retractor installation component 221, and the first ratchet 223 and the second ratchet 224 rotate relative to the retractor installation component 221. The first ratchet 223 is connected to an end of the rotating shaft 222, and the second ratchet 224 is connected to another end of the rotating shaft 222. Specially, the first ratchet 223 and the second ratchet 224 can be fixed with the rotating shaft 222, and directions of teeth of the first ratchet 223 and the second ratchet 224 are opposite to each other. That is, when the first ratchet 223 is restrained, the second ratchet 224 is released, and when the second ratchet 224 is restrained, the first ratchet 223 is released.

As shown in FIG. 4, the safety belt retractor 22 includes a restraining assembly 220 for restraining movement of the safety belt 10 in a predetermined direction. Preferably, the restraining assembly 220 includes a first restraining component 225 installed on the retractor installation component 221 in a swingable manner and for selectively engaging with or separating from the first ratchet 223, and a second restraining component 226 installed on the retractor installation component 221 in a swingable manner and for selectively engaging with or separating from the second ratchet 224. The second restraining component 226 is located between the safety belt buckle fastening assembly 21 and the first restraining component 225 along a length extending direction of the linking component 23. A middle portion of the second restraining component 226 is pivotally connected to the retractor installation component 221. The first restraining component 225 and the second restraining component 226 are located at two sides of the second ratchet 224 along a radial direction of the rotating shaft 222, and the first restraining component 225 is spaced from the second ratchet 224. A rotation in a first direction of the rotating shaft 222 can be restrained so as to restrain the safety belt 10 from releasing from the rotating shaft 222 when the first ratchet 223 is engaged with the first restraining component 225 of the restraining assembly 220 and the second ratchet 224 is separated from the second restraining component 226 of the restraining assembly 220, and a rotation in a second direction opposite to the first direction of the rotating shaft 222 can be restrained so as to restrain the safety belt 10 from winding around the rotating shaft 222 when the second ratchet 224 is engaged with the second restraining component 226 of the restraining assembly 220 and the first ratchet 223 is separated from the first restraining component 225 of the restraining assembly 220.

Specifically, as shown in FIG. 3 to FIG. 6, the first restraining component 225 is installed on a side of the rotating shaft 222 and extends along an axial direction of the rotating shaft 222, and the first restraining component 225 can be resiliently installed on the retractor installation component 221 by a first resilient component 225a, such as a torsional spring, in a swingable manner, and a first restraining component 225 installed on the retractor installation component 221 in a swingable manner and for selectively engaging with or separating from the first ratchet 223. The first resilient component 225a is between the first restraining component 225 and the retractor installation component 221. The first restraining component 225 can be formed in a plate shape and made of metal material. An end of the first restraining component 225 is configured to engage with or separate from the first ratchet 223, and another end of the first restraining component 225 is driven by the linking component 23. A protruding portion 2251 is formed on an end of the first restraining component 225 and configured to engage with sunken portions 2231 of the first ratchet 223. A mating surface 2252 is formed on another end of the first restraining component 225 and configured to abut against an abutting surface 231, formed on the second end of the linking component 23. A groove structure can be formed on the linking component 23 along a moving direction (specifically forward/backward direction) of the linking component 23, the abutting surface 231 can be a lateral wall of the groove structure of the linking component, and the mating surface 2252 of the first restraining component 225 can be disposed in the groove structure. The mating surface 2252 of the first restraining component 225 moves in the groove structure when the linking component 23 moves, and the mating surface 2252 abuts against the abutting surface 231 when the first restraining component 225 is separated from the first ratchet 223.

The first restraining component 225 can be driven by the linking component 23 for selectively engaging with or separating from the first ratchet 223. The second restraining component 226 is installed on another side of the rotating shaft 222 and located in a position adjacent to the second ratchet 224, and the second restraining component 226 can be resiliently installed on the retractor installation component 221 by a second resilient component 226a, such as a torsional spring, in a swingable manner. The second resilient component 226a is between the second restraining component 226 and the retractor installation component 221. The second restraining component 226 can be driven by the linking component 23 for selectively engaging with or separating from the second ratchet 224. Specifically, a middle portion of the second restraining component 226 is installed on the retractor installation component 221 via a pivot, an end of the second restraining component 226 is connected to and driven by the linking component 23, and another end of the second restraining component 226 is configured to engage with or separate from the second ratchet 224. For example, a sliding hole can be formed on the linking component 23, the end of the second restraining component 226 slides in the sliding hole when the linking component 23 moves, and the end of the second restraining component 226 abuts against an edge of the sliding hole along the moving direction (specifically forward/backward direction) of the linking component 23 when the second restraining component 226 is separated from the second ratchet 224.

Specifically, when a child does not sit on the child safety seat 1 and the safety belt buckle fastening assembly 21 does not buckle with the safety belt buckle 13, the safety belt automatic adjustment apparatus 2 is in the releasing status as shown in FIG. 3. At this time, the safety belt automatic adjustment apparatus 2 faces forwardly, the abutting surface 231 on the second end of the linking component 23 abuts against the mating surface 2252 on the first restraining component 225, the first restraining component 225 separates from the first ratchet 223, the end of the second restraining component 226 is connected to the linking component 23, and the second resilient component 226a can be biased to drive the another end of the second restraining component 226 to engage with the second ratchet 224, as shown in FIG. 4. In the releasing status, a clockwise rotation of the second ratchet 224 is restrained, a counterclockwise rotation of the second ratchet 224 is not restrained, and the first ratchet 223 can rotate in a counterclockwise direction with the second ratchet 224. That is, the safety belt retractor 2 can be rotated in the counterclockwise direction, so that the safety belt 10 can be released and pulled out.

When a child sits on the child safety seat 1 and the safety belt buckle fastening assembly 21 buckles with the safety belt buckle 13, the safety belt automatic adjustment apparatus 2 is in the restraining status as shown in FIG. 5. When the safety belt buckle fastening assembly 21 is pushed from a position as shown in FIG. 3 to a position as shown in FIG. 5 along an arrow direction, the linking component 23 is driven forwardly along the arrow direction with the safety belt buckle fastening assembly 21 to separate from the first restraining component 225, i.e., the abutting surface 231 on the second end of the linking component 23 is spaced from the mating surface 2252 on the first restraining component 225 and the first resilient component 225a can be biased to drive the first restraining component 225 without being abutted by the linking component 23 to rotate toward the first ratchet 223 so as to engage with the first ratchet 223. At this time, the second restraining component 226 is driven by the linking component 23 to move away from the second ratchet 223, so as to disengage from the second ratchet 224, as shown in FIG. 6. In the restraining status, a counterclockwise rotation of the first ratchet 223 is restrained, a clockwise rotation of the first ratchet 223 is not restrained, and the second ratchet 224 can rotate in a clockwise direction with the first ratchet 223. That is, the safety belt retractor 2 can be rotated in the clockwise direction, so that the safety belt 10 can be retracted and tightened by the safety belt retractor 2 automatically.

In contrast to the prior art, the safety belt retractor can be locked or released by adjusting statuses of the safety belt buckle fastening assembly of the safety belt automatic adjustment apparatus of the present application, so as to lock or release the safety belt automatically. When a child sits on the child safety seat and the safety belt buckle fastening assembly buckles with the safety belt buckle, the safety belt can be tightened automatically, which has advantages of automatic adjustment for the safety belt without manual adjustment, simple structure, convenient operation and enhanced safety.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A safety belt automatic adjustment apparatus comprising:
a safety belt retractor for retracting a safety belt, the safety belt retractor comprising a rotating shaft, a restraining assembly, a first ratchet and a second ratchet, the first ratchet and the second ratchet being connected to two ends of the rotating shaft, the safety belt winding around the rotating shaft, the restraining assembly being configured to selectively engage with or separate from the first ratchet and the second ratchet, and directions of teeth of the first ratchet and the second ratchet being opposite to each other;
a linking component for driving the restraining assembly; and
a safety belt buckle fastening assembly, the safety belt buckle fastening assembly being exposed out of a base of a child safety seat and rotatable relative to the base of the child safety seat around an axis, and the safety belt buckle fastening assembly being fixed on the linking component;
wherein a rotation in a first direction of the rotating shaft is restrained so as to restrain the safety belt from releasing from the rotating shaft when the first ratchet is engaged with the restraining assembly and the second ratchet is separated from the restraining assembly, and a rotation in a second direction opposite to the first direction of the rotating shaft is restrained so as to restrain the safety belt from winding around the rotating shaft when the second ratchet is engaged with the restraining assembly and the first ratchet is separated from the restraining assembly.

2. The safety belt automatic adjustment apparatus of claim 1, wherein the restraining assembly comprises:
a first restraining component for selectively engaging with or separating from the first ratchet; and
a second restraining component for selectively engaging with or separating from the second ratchet;
wherein when the first restraining component is engaged with the first ratchet, the second restraining component is separated from the second ratchet, and when the second restraining component is engaged with the second ratchet, the first restraining component is separated from the first ratchet.

3. The safety belt automatic adjustment apparatus of claim 2, wherein the safety belt retractor further comprises a retractor installation component, the rotating shaft is pivotally connected to the retractor installation component, and the first restraining component is installed on the retractor installation component in a swingable manner and for selectively engaging with or separating from the first ratchet, the second restraining component is installed on the retractor installation component in a swingable manner and for selectively engaging with or separating from the second ratchet.

4. The safety belt automatic adjustment apparatus of claim 3, further comprising a first resilient component and a second resilient component, the first resilient component being between the first restraining component and the retractor installation component, and the second resilient component being between the second restraining component and the retractor installation component.

5. The safety belt automatic adjustment apparatus of claim 2, the first restraining component being driven by the linking component for selectively engaging with or separating from the first ratchet, and the second restraining component being driven by the linking component for selectively engaging with or separating from the second ratchet.

6. The safety belt automatic adjustment apparatus of claim 5, wherein an abutting surface is formed on the linking component, the abutting surface is spaced from the first restraining component when the first restraining component is engaged with the first ratchet, and the abutting surface abuts against the first restraining component when the first restraining component is separated from the first ratchet.

7. The safety belt automatic adjustment apparatus of claim 6, wherein a groove structure is formed on the linking component, the abutting surface is a lateral wall of the groove structure, the first restraining component is disposed in the groove structure, the first restraining component moves in the groove structure when the linking component moves, and the first restraining component abuts against the abutting surface when the first restraining component is separated from the first ratchet.

8. The safety belt automatic adjustment apparatus of claim 5, wherein the first restraining component extends along an axial direction of the rotating shaft, an end of the first restraining component is configured to engage with or separate from the first ratchet, and another end of the first restraining component is driven by the linking component.

9. The safety belt automatic adjustment apparatus of claim 5, wherein the safety belt retractor further comprises a retractor installation component, the rotating shaft is pivotally connected to the retractor installation component, a middle portion of the second restraining component is pivotally connected to the retractor installation component, an end of the second restraining component is driven by the linking component, and another end of the second restraining component is configured to engage with or separate from the second ratchet.

10. The safety belt automatic adjustment apparatus of claim 9, wherein a sliding hole is formed on the linking component, the end of the second restraining component slides in the sliding hole when the linking component moves.

11. The safety belt automatic adjustment apparatus of claim 2, wherein the first restraining component and the second restraining component are located at two sides of the second ratchet along a radial direction of the rotating shaft, and the first restraining component is spaced from the second ratchet.

12. The safety belt automatic adjustment apparatus of claim 2, wherein the second restraining component is located between the safety belt buckle fastening assembly and the first restraining component along a length extending direction of the linking component.

13. The safety belt automatic adjustment apparatus of claim 2, further comprising a first resilient component, the first restraining component being driven by the linking component for separating from the first ratchet, and the first restraining component being driven by the first resilient component for engaging with the first ratchet.

14. The safety belt automatic adjustment apparatus of claim 2, wherein the linking component drives the first restraining component to separate from the first ratchet and drives the second restraining component to separate from the second ratchet.

15. The safety belt automatic adjustment apparatus of claim 14, further comprising a first resilient component and a second resilient component, the first resilient component being biased to drive the first restraining component to engage with the first ratchet, the second resilient component being biased to drive the second restraining component to engage with the second ratchet, the linking component driving the first restraining component to separate from the first ratchet and the second resilient component driving the second restraining component to engage with the second ratchet simultaneously, and the linking component driving the second restraining component to separate from the second ratchet and the first resilient component driving the first restraining component to engage with the first ratchet simultaneously.

16. The safety belt automatic adjustment apparatus of claim 1, wherein the safety belt buckle fastening assembly comprises a rotary shaft and an insertion component connected to the rotary shaft, the insertion component is exposed out of the base of the child safety seat, the linking component is fixed on the rotary shaft, the insertion component rotates to drive the rotary shaft to rotate so as to move the linking component.

17. A child safety seat comprising the safety belt automatic adjustment apparatus of claim 1 and a safety belt.

18. A child safety seat comprising the safety belt automatic adjustment apparatus of claim 1, a base, a safety belt and a safety belt buckle connected to the safety belt, wherein the safety belt buckle is buckled with the safety belt buckle fastening assembly.

19. The child safety seat of claim 18, wherein the safety belt comprises a cross belt, a waist belt and two shoulder belts.

* * * * *